(12) United States Patent
Pan et al.

(10) Patent No.: US 12,510,386 B2
(45) Date of Patent: Dec. 30, 2025

(54) TEST DEVICE AND TEST METHOD FOR RIGID-FLEXIBLE CHARACTERISTICS OF RIGID-FLEXIBLE TRANSITION OVERHEAD CONDUCTOR RAIL

(71) Applicants: STANDARDS AND METROLOGY RESEARCH INSTITUTE, CHINA ACADEMY OF RAILWAY SCIENCES CORPORATION LIMITED, Beijing (CN); CHINA RAILWAY TEST AND CERTIFICATION CENTER LIMITED, Beijing (CN); CHINA ACADEMY OF RAILWAY SCIENCES CORPORATION LIMITED, Beijing (CN)

(72) Inventors: Like Pan, Beijing (CN); Liming Chen, Beijing (CN); Tong Xing, Beijing (CN); Haibo Zhang, Beijing (CN); Yuan Yuan, Beijing (CN); Caizhi Yang, Beijing (CN)

(73) Assignees: STANDARDS AND METROLOGY RESEARCH INSTITUTE, CHINA ACADEMY OF RAILWAY SCIENCES CORPORATION LIMITED, Beijing (CN); CHINA RAILWAY TEST AND CERTIFICATION CENTER LIMITED, Beijing (CN); CHINA ACADEMY OF RAILWAY SCIENCES CORPORATION LIMITED, Beijing (CN)

( * ) Notice: Subject to any disclaimer, the term of this patent is extended or adjusted under 35 U.S.C. 154(b) by 530 days.

(21) Appl. No.: 18/010,024
(22) PCT Filed: Oct. 19, 2022
(86) PCT No.: PCT/CN2022/126030
§ 371 (c)(1),
(2) Date: Dec. 13, 2022
(87) PCT Pub. No.: WO2024/027020
PCT Pub. Date: Feb. 8, 2024

(65) Prior Publication Data
US 2024/0167856 A1    May 23, 2024

(30) Foreign Application Priority Data
Aug. 2, 2022   (CN) .......................... 202210918846.8

(51) Int. Cl.
*G01D 21/02*     (2006.01)
*G01S 17/08*     (2006.01)

(52) U.S. Cl.
CPC .............. *G01D 21/02* (2013.01); *G01S 17/08* (2013.01)

(58) Field of Classification Search
CPC ................. B60L 5/16; B60L 5/24; B60L 5/28
See application file for complete search history.

(56) References Cited

U.S. PATENT DOCUMENTS

| | | | | |
|---|---|---|---|---|
| 5,735,374 | A * | 4/1998 | Breitbach | B60L 5/32 191/65 |
| 5,954,171 | A * | 9/1999 | Gramatke | B60L 5/16 191/67 |
| 6,418,397 | B1 * | 7/2002 | Brand | B60L 5/28 701/19 |

\* cited by examiner

*Primary Examiner* — Lam S Nguyen
(74) *Attorney, Agent, or Firm* — CARLSON, GASKEY & OLDS, P.C.

(57) ABSTRACT

A test device for rigid-flexible characteristics of a rigid-flexible transition overhead conductor rail, includes a movable vehicle moved in a length extending direction of the overhead conductor rail. A telescopic mechanism for providing lifting force for the overhead conductor rail is mounted on the movable vehicle and stretches out and draws back in a vertical direction, and a conversion plate is connected to a top end of the telescopic mechanism and synchronously moved in the vertical direction therewith. A sliding assembly is mounted at a top of the conversion plate and slides along the overhead conductor rail with the movable vehicle. The overhead conductor rail is located over the sliding assembly which abuts against a bottom wall of the overhead conductor rail. A force sensor is arranged between (Continued)

the telescopic mechanism and the conversion plate. A displacement detection mechanism is arranged on the conversion plate.

17 Claims, 1 Drawing Sheet

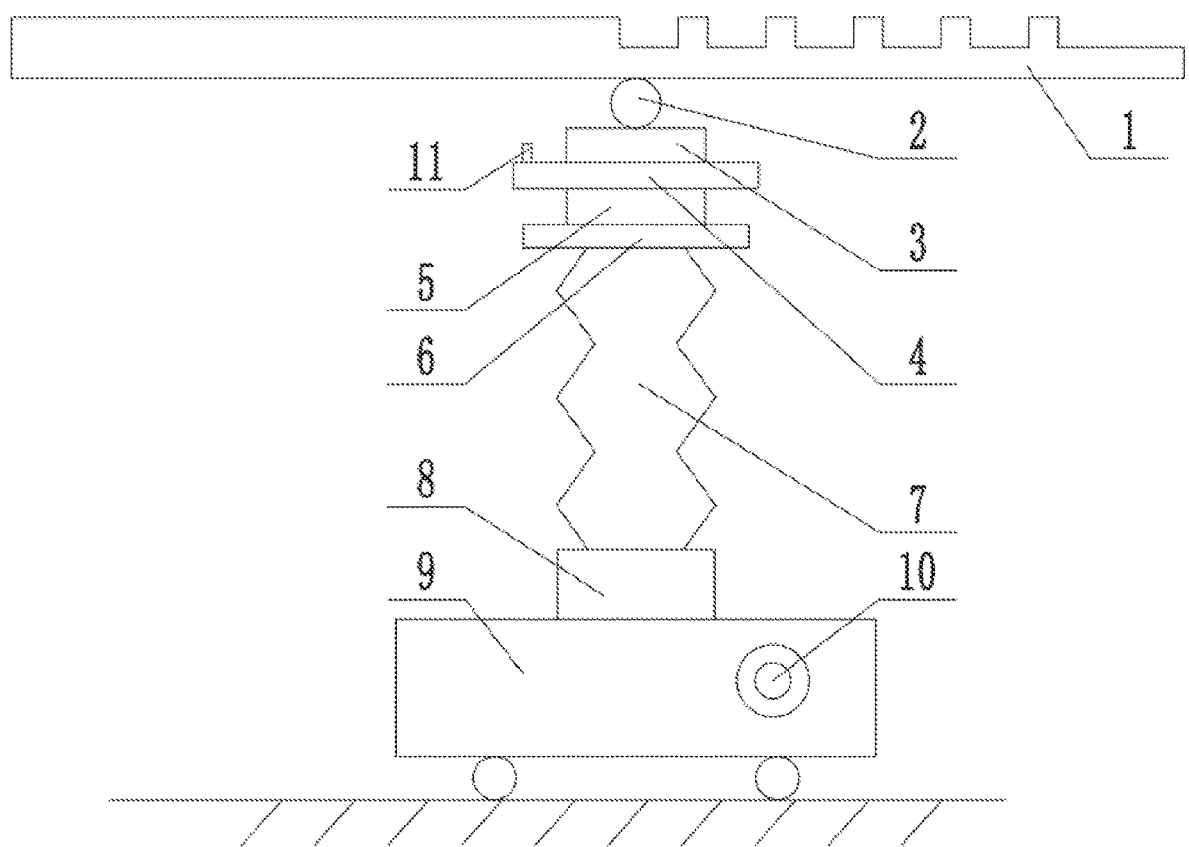

TEST DEVICE AND TEST METHOD FOR RIGID-FLEXIBLE CHARACTERISTICS OF RIGID-FLEXIBLE TRANSITION OVERHEAD CONDUCTOR RAIL

CROSS-REFERENCE TO RELATED APPLICATION

This application is a national stage of International Application No. PCT/CN2022/126030, filed on Oct. 19, 2022, which claims priority to Chinese Patent Application No. 202210918846.8, filed on Aug. 2, 2022, both of the aforementioned applications are hereby incorporated by reference in their entireties.

TECHNICAL FIELD

The present disclosure relates to the technical field of tunnels and urban rail transit, and particularly relates to a test device and test method for rigid-flexible characteristics of a rigid-flexible transition overhead conductor rail.

BACKGROUND

A rigid overhead contact system is an important power supply mode for a rail transit overhead contact system and mainly used in the fields of tunnels, urban rail transit and the like. Rigid-flexible transition overhead conductor rail is an important transition component for the rigid overhead contact system and a flexible overhead contact system. In general, the lifting amount of the rigid-flexible transition overhead conductor rail under static fixed contact pressure is represented by means of the rigid-flexible characteristics, the rigid-flexible characteristics reflects static contact characteristic between a pantograph at the top of the train and the rigid-flexible transition overhead conductor rail in the actual service process. Parameters such as contact pressure and displacement needs to be controlled during test.

At present, the rigid-flexible characteristics of rigid-flexible transition overhead conductor rail are mainly tested with reference to *Overhead Conductor Rail and Fittings for Rigid Overhead Contact system in Electrification Railway TB/T3252-2022*. The rigid-flexible characteristics may be tested manually, that is, the fixed contact pressure is applied manually and then the displacement of the rigid-flexible transition overhead conductor rail is tested, the test efficiency is low, and the test precision is not guaranteed. The rigid-flexible characteristics may be tested using mechanical devices, that is, a fixed tension load is applied by means of a balance weight and the like, and then the lifting amount is tested using a displacement sensor. However, there are many defects in the operation process of the existing test method: firstly, a force loading mode is not flexible and convenient enough, leading to the increase of the test workload; and secondly, the test has a high requirement on the displacement precision, but the displacement measurement precision still cannot be effectively guaranteed in the existing test method, affecting the measurement results to a certain extent. Furthermore, by combining the characteristics of the rigid-flexible transition overhead conductor rail of the rigid-flexible overhead contact system and the transition characteristics between the rigid-flexible transition overhead conductor rail and the flexible overhead contact system, parameters such as elastic buffering are not fully considered. Therefore, the existing method cannot truly reflect the service characteristics of the rigid-flexible transition overhead conductor rail, and the operation during testing is inconvenient.

As the contact force and lifting displacement in the rigid-flexible characteristic test are key parameters, the forward operating speed along the rigid-flexible transition overhead conductor rail also has an important influence on performance of the rigid-flexible transition overhead conductor rail. At present, the rigid-flexible characteristics of the rigid-flexible transition overhead conductor rail are tested manually or using mechanical devices, but the control precision on the parameters such as applied contact force and tested displacement in the testing process is not enough, and the buffering effect of the elasticity in the contact process between the rigid overhead contact system as well as the flexible overhead contact system and pantograph is not fully considered, leading to a certain difference between the tested data and the real service characteristics, thereby affecting the accuracy of data.

SUMMARY

An objective of the present disclosure is to provide a test device and test method for rigid-flexible characteristics of a rigid-flexible transition overhead conductor rail, to solve the problems in the prior art. By simulating the rigid-flexible characteristics of the rigid-flexible transition overhead conductor rail when a pantograph on a top of an actual train is in contact with the rigid-flexible transition overhead conductor rail during passage of the actual train, the rigid-flexible characteristics of the rigid-flexible transition overhead conductor rail are tested more truly, thereby accurately evaluating performances of different rigid-flexible transition overhead conductor rails.

To achieve the above object, the present disclosure provides a test device for rigid-flexible characteristics of a rigid-flexible transition overhead conductor rail. The rigid-flexible transition overhead conductor rail includes:

a movable vehicle moved in a length extending direction of the rigid-flexible transition overhead conductor rail, a telescopic mechanism mounted on the movable vehicle and configured for providing lifting force for the rigid-flexible transition overhead conductor rail, where the telescopic mechanism stretches out and draws back in a vertical direction;

a conversion plate connected to a top end of the telescopic mechanism and configured to synchronously move in the vertical direction with the telescopic mechanism;

a sliding assembly mounted at a top of the conversion plate;

a force sensor arranged between the telescopic mechanism and the conversion plate, and configured to detect and adjust the lifting force to be constant; and a displacement detection mechanism arranged on the conversion plate and configured to monitor a vertical distance between the conversion plate and the ground;

where the sliding assembly slides along the rigid-flexible transition overhead conductor rail with the movable vehicle; the rigid-flexible transition overhead conductor rail is located over the sliding assembly, and the sliding assembly abuts against a bottom wall of the rigid-flexible transition overhead conductor rail.

In some embodiments, an elastic assembly for buffering the lifting force is arranged between the telescopic mechanism and the displacement sensor.

In some embodiments, a bottom end of the elastic assembly is connected to the telescopic mechanism, and a pedestal for supporting the displacement detection mechanism is connected to a top end of the elastic assembly.

In some embodiments, the telescopic mechanism is a pneumatic cylinder; the pneumatic cylinder includes a cylinder body and a telescopic rod telescopically arranged on the cylinder body in the vertical direction; the elastic assembly is connected to the cylinder body, and the telescopic rod is located between the cylinder body and the movable vehicle.

In some embodiments, the displacement detection mechanism includes a laser range finder and a displacement sensor which are arranged on the conversion plate together; the laser range finder and the displacement sensor are both configured to measure a distance between the conversion plate and the ground.

In some embodiments, the displacement sensor includes a base arranged on the conversion plate, and the sliding assembly is mounted on the base.

In some embodiments, the sliding assembly includes a mounting plate arranged on the base; a support wheel abutting against the bottom wall of the rigid-flexible transition overhead conductor rail is arranged on the mounting plate.

In some embodiments, the movable vehicle includes a vehicle body and a plurality of pulleys arranged at a bottom of the vehicle body, the pulleys are movably arranged on the ground, and a motor for driving the pulleys to move at a constant speed is arranged on the vehicle body.

In some embodiments, the elastic assembly is a spring stretching out and drawing back in the vertical direction.

The present disclosure also provides a test method using the test device for rigid-flexible characteristics of the rigid-flexible transition overhead conductor rail, including following steps:

driving the movable vehicle: controlling, by the motor and a control system, displacement and speed of horizontal movement of the movable vehicle, thereby achieving a purpose of stably testing a lifting amount of the rigid-flexible transition overhead conductor rail in a length direction;

adjusting lifting force: in forward movement process of the movable vehicle, providing, by the pneumatic cylinder, upward and stable contact force to enable the support wheel to be in contact with the rigid-flexible transition overhead conductor rail; and buffering, by means of the spring, a relationship between the contact force and the lifting amount to simulate elasticity of a pantograph; and testing, by the force sensor, the lifting force;

measuring a distance between the conversion plate and the ground: determining, by means of double calibration of the laser range finder and the displacement sensor, the lifting amount of the rigid-flexible transition overhead conductor rail, and eliminating interference of factors such as uneven ground; and measuring the lifting amount: monitoring data of the lifting amount and the lifting force by the laser range finder, the displacement sensor and the force sensor; and regulating and controlling, by the control system, the speed of the movable vehicle, output quantity of the pneumatic cylinder, thereby forming a closed-loop control with the sensor.

Compared with the prior art, the present disclosure has the following technical effects.

Firstly, the test device includes the movable vehicle moved in a length extending direction of the rigid-flexible transition overhead conductor rail. The telescopic mechanism for providing lifting force for the rigid-flexible transition overhead conductor rail is mounted on the movable vehicle and stretches out and draws back in a vertical direction, and a conversion plate synchronously moved in the vertical direction with the telescopic mechanism is connected to the top end of the telescopic mechanism. A sliding assembly is mounted at the top of the conversion plate and slides along the rigid-flexible transition overhead conductor rail with the movable vehicle; the rigid-flexible transition overhead conductor rail is located over the sliding assembly, and the sliding assembly abuts against the bottom wall of the rigid-flexible transition overhead conductor rail. The force sensor for detecting and adjusting the lifting force to be constant is arranged between the telescopic mechanism and the conversion plate. The displacement detection mechanism for monitoring a vertical distance between the conversion plate and the ground is arranged on the conversion plate. The telescopic mechanism and the sliding assembly are driven by the movable vehicle to move along the rigid-flexible transition overhead conductor rail, so that the sliding assembly abuts against the rigid-flexible transition overhead conductor rail in a sliding manner, thereby simulating the contact between a pantograph at the top of a train and the rigid-flexible transition overhead conductor rail. Compared with a mode of reflecting the deformation of the rigid-flexible transition overhead conductor rail by means of static hoisting in the prior art, the lifting amount of the rigid-flexible transition overhead conductor rail during actual use is more truly reflected. Moreover, through the cooperation of the telescopic mechanism and the force sensor, the contact force during lifting is regulated and controlled in a closed-loop manner by adjusting the telescopic amount of the telescopic mechanism and detecting the displacement of the force sensor. The mutual automatic regulation and control can be achieved in the movement process, the control precision of the lifting force is high and the value of the lifting force is table, and thus the stable lifting force is output by the telescopic mechanism, thereby more accurately testing the lifting amount of the rigid-flexible transition overhead conductor rail.

Secondly, the elastic assembly for buffering the lifting force is arranged between the telescopic mechanism and the displacement sensor. The buffering of the pantograph on the rigid-flexible transition overhead conductor rail can be simulated by the elastic assembly, thus the rigid impact is avoided which reduces the test error. Moreover, the impact of a large load may also be avoided by the elastic assembly, thereby improving the service life of the whole device.

Thirdly, the bottom end of the elastic assembly is connected to the telescopic mechanism, and the pedestal for supporting the displacement detection mechanism is connected to the top end of the elastic assembly. The pedestal is provided to guarantee the bearing stability of the elastic assembly and the effectiveness of the elastic assembly in buffering. The displacement sensor is supported by means of the pedestal, thus preventing the elastic assembly from being affected by the own structure of the displacement sensor.

Fourthly, the telescopic mechanism is a pneumatic cylinder. The pneumatic cylinder includes the cylinder body and the telescopic rod telescopically arranged on the cylinder body in the vertical direction. The elastic assembly is connected to the cylinder body, and the telescopic rod is located between the cylinder body and the movable vehicle. The telescopic rod is supported between the cylinder body and the movable vehicle to prevent the telescopic rod from being in direct contact with the elastic assembly, such that the arrangement of the elastic assembly is limited by the telescopic rod; and the cylinder body is connected to the elastic assembly so that the cylinder body provides stable and effective bearing for the elastic assembly.

BRIEF DESCRIPTION OF THE DRAWINGS

To describe the technical solutions in the embodiments of the present disclosure or in the prior art more clearly, the following briefly describes the accompanying drawings for the embodiments. Apparently, the accompanying drawings in the following description show merely some embodiments of the present disclosure, and a person of ordinary skill in the art may still derive other drawings from these accompanying drawings without paying creative efforts.

FIGURE is a schematic diagram of an overall structure in accordance with the present disclosure.

Reference numerals: 1—rigid-flexible transition overhead conductor rail; 2—sliding assembly; 3—displacement sensor; 4—conversion plate; 5—force sensor; 6—pedestal; 7—elastic assembly; 8—telescopic mechanism; 9—mobile vehicle; 10—motor; 11—laser range finder.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without paying creative efforts shall fall within the protection scope of the present disclosure.

An objective of the present disclosure is to provide a test device and test method for rigid-flexible characteristics of a rigid-flexible transition overhead conductor rail so as to solve the problems in the prior art. By simulating the rigid-flexible characteristics of the rigid-flexible transition overhead conductor rail when a pantograph on top of the train is in contact therewith during passage of an actual train, the rigid-flexible characteristics of the rigid-flexible transition overhead conductor rail in a static state are tested more truly, thereby accurately evaluating performances of different rigid-flexible transition overhead conductor rails.

To make the objects, features and advantages of the present disclosure more apparently, the present disclosure will be further described in detail below with reference to the accompanying drawings and specific embodiments.

Please refer to FIGURE, the embodiment provides a test device for rigid-flexible characteristics of a rigid-flexible transition overhead conductor rail. The test device includes a movable vehicle 9 capable of moving in a length extending direction of the rigid-flexible transition overhead conductor rail 1, specifically, the movable vehicle 9 is movably arranged on the ground. A telescopic mechanism 8 for providing lifting force for the rigid-flexible transition overhead conductor rail 1 is mounted on the movable vehicle 9 and stretches out and draws back in a vertical direction, and a conversion plate 4 synchronously moving in the vertical direction with the telescopic mechanism 8 is connected to a top end of the telescopic mechanism 8. A sliding assembly 2 is mounted at a top of the conversion plate 4 and slides along the rigid-flexible transition overhead conductor rail 1 with the movable vehicle 9. The rigid-flexible transition overhead conductor rail 1 is located over the sliding assembly 2, and the sliding assembly 2 abuts against a bottom wall of the rigid-flexible transition overhead conductor rail 1. A force sensor 5 for detecting and adjusting the lifting force to be constant is arranged between the telescopic mechanism 8 and the conversion plate 4, and is configured to actually reflect contact force of the telescopic mechanism 8 acting upwards on the rigid-flexible transition overhead conductor rail 1. A displacement detection mechanism for monitoring a vertical distance between the conversion plate 4 and the ground is arranged on the conversion plate 4. The telescopic mechanism 8 and the sliding assembly 2 are driven by the movable vehicle 9 to move along the rigid-flexible transition overhead conductor rail 1, so that the sliding assembly 2 abuts against the rigid-flexible transition overhead conductor rail 1 in a sliding manner so as to simulate the contact between a pantograph at a top of a train and the rigid-flexible transition overhead conductor rail 1. Compared with a mode of reflecting the amount of deformation of the rigid-flexible transition overhead conductor rail 1 by means of static hoisting in the prior art, the present disclosure reflects the lifting amount of the rigid-flexible transition overhead conductor rail 1 during actual use more truly. Moreover, through the cooperation of the telescopic mechanism 8 and the force sensor 5, the lifting fore is the force actually measured by the force sensor 5, and the lifting force is associated with the elongation amount of the telescopic mechanism 8. The contact force during lifting is regulated and controlled in a closed-loop manner by adjusting the telescopic amount of the telescopic mechanism 8 and detecting the displacement of the force sensor 5. The mutual automatic regulation and control can be achieved in the movement process, the control precision for the lifting force is high, the value of the lifting force is stable, and thus the stable lifting force is output by the telescopic mechanism 8, and the lifting amount of the rigid-flexible transition overhead conductor rail 1 can be tested more accurately. In some embodiments, various assemblies are arranged along the center directly facing the movable vehicle 9 so as to guarantee stability of the whole device structure.

An elastic assembly 7 for buffering the lifting force is arranged between the telescopic mechanism 8 and the displacement sensor 3. The buffering of a pantograph on the rigid-flexible transition overhead conductor rail 1 can be simulated by providing the elastic assembly 7, thus the rigid impact is avoided, thereby reducing the test error. Moreover, the lifting force is generated on the rigid-flexible transition overhead conductor rail 1 after the telescopic mechanism 8 stretches out; and when the sliding assembly 2 is in contact with the rigid-flexible transition overhead conductor rail 1, in order to avoid hard contact, i.e., avoiding the impact of a large load, the elastic assembly 7 is additionally provided for buffering to achieve soft contact and simulating the elasticity of the actual overhead contact system. The telescopic mechanism 8 is configured to provide upward displacement to lift the rigid-flexible transition overhead conductor rail 1. The elastic assembly 7 is configured for buffering, and thus the service life of the whole device is improved.

In some embodiments, a bottom end of the elastic assembly 7 is connected to the telescopic mechanism 8, and a pedestal 6 for supporting a displacement detection mechanism is connected to a top end of the elastic assembly. The pedestal 6 is provided to guarantee bearing stability of the elastic assembly 7 and ensure effectiveness of the elastic assembly 7 in buffering. The displacement sensor 3 is supported by the pedestal 6, thus preventing the elastic assembly 7 from being affected by the own structure of the displacement sensor 3.

Further, the telescopic mechanism 8 is a pneumatic cylinder. The pneumatic cylinder includes a cylinder body and a telescopic rod telescopically arranged on the cylinder body in a vertical direction. The elastic assembly 7 is connected to the cylinder body, the telescopic rod is located between the cylinder body and the movable vehicle 9. The telescopic rod is supported between the cylinder body and the movable vehicle 9 to prevent the telescopic rod from being in direct contact with the elastic assembly 7, such that the arrangement of the elastic assembly 7 is limited by the telescopic rod, the cylinder body is connected to the elastic assembly 7 so that the cylinder body is configured to form stable and effective bearing for the elastic assembly 7.

As a preferred embodiment of the present disclosure, the displacement detection mechanism includes a laser range finder 11 and a displacement sensor 3 which are arranged on the conversion plate 4 together. The laser range finder 11 and the displacement sensor 3 are configured to measure a distance between the conversion plate 4 and the ground. The laser range finder 11 is configured to actually measure a distance between a position where the conversion plate is located and the ground, the displacement sensor 3 is configured to actually measure a height from the position where the conversion plate is located to the ground, and a height difference at the position is calibrated by means of the data difference between the laser range finder 11 and the displacement sensor 3, thereby eliminating the influence of the ground height difference on the actually measured lifting data. The actually measured lifting amount data of the rigid-flexible transition overhead conductor rail 1 are mutually calibrated by the laser range finder 11 and the displacement sensor 3 so as to guarantee accuracy of the data and high testing precision. In some embodiments, the laser range finder 11 and the displacement sensor 3 are provided with a matched controller. During movement of the movable vehicle 9, due to the real-time supporting of the conversion plate 4 to the sliding assembly 2 under the supporting effect of the elastic assembly 7, the sliding assembly 2 may abut against the bottom wall of the rigid-flexible transition overhead conductor rail 1. A portion from the conversion plate 4 to the movable vehicle 9, due to the arrangement of the elastic assembly 7 and the telescopic mechanism 8, may stretch out or draw back along with the lifting amount of the rigid-flexible transition overhead conductor rail 1. After the distance between the conversion plate 4 and the ground is detected by the laser range finder 11 and the displacement sensor 3 in real time, the lifting amount of the rigid-flexible transition overhead conductor rail 1 can be reflected, and then a lifting amount signal can be transmitted to the controller to obtain relevant information in real time.

Further, the displacement sensor 3 includes a base arranged on the conversion plate 4, and the sliding assembly 2 is arranged on the base. On the one hand, the displacement sensor 3 can be arranged at a center position of the conversion plate 4 to guarantee the stability of the whole device. On the other hand, the base of the displacement sensor 3 is mounted between the sliding assembly 2 and the conversion plate 4 as the support for the sliding assembly 2, thereby preventing the displacement sensor 3 from being arranged on one side of the sliding assembly 2, which may affect the sliding of the sliding assembly 2.

As a preferred embodiment of the present disclosure, the sliding assembly 2 includes a mounting plate arranged on the base, a support wheel abutting against the bottom wall of the rigid-flexible transition overhead conductor rail 1 is arranged on the mounting plate so as to move along the rigid-flexible transition overhead conductor rail 1 in real time. As another preferred embodiment of the present disclosure, the sliding assembly 2 is a pantograph sliding plate which is in contact with the rigid-flexible transition overhead conductor rail 1 so as to simulate an actual contact state of the pantograph sliding plate.

As a preferred embodiment of the present disclosure, the movable vehicle 9 includes a vehicle body 9 and a plurality of pulleys mounted at a bottom of the vehicle body. The pulleys are movably arranged on the ground. The vehicle body is provided with a motor 10 for driving the pulleys to move at a constant speed. The movable vehicle 9 is placed on the ground and thus can linearly move at a constant speed along the ground under action of the motor 10. The displacement, speed and the like of the forward horizontal movement of the movable vehicle 9 are controlled to adapt to different tests on the rigid-flexible transition overhead conductor rail.

In some embodiments, a buffer assembly is a spring stretching out and drawing back in a vertical direction. In some embodiments, the elastic assembly 7 is a pneumatic cylinder, the spring is mounted above the pneumatic cylinder and configured to buffer the upward lifting force of the pneumatic cylinder, thus enabling the pneumatic cylinder to apply the lifting force slowly and maintain the buffer action.

Further, the present disclosure also provides a test method of the test device for rigid-flexible characteristics of the rigid-flexible transition overhead conductor rail 1, which includes the following steps:

Driving the movable vehicle 9: the displacement and speed of the horizontal movement of the movable vehicle 9 are controlled by the motor 10 and the control system, thus achieving a purpose of stably testing a lifting amount of the rigid-flexible transition overhead conductor rail 1 in a length direction.

Adjusting lifting force: in the forward movement process of the movable vehicle 9, the pneumatic cylinder provides upward and stable contact force to enable the support wheel to be in contact with the rigid-flexible transition overhead conductor rail 1, the spring is configured to buffer a relationship between the contact force and the lifting amount so as to simulate elasticity of a pantograph, and the lifting force is tested by the force sensor 5.

Measuring the distance between the overhead conductor rail and the ground: the lifting amount of the rigid-flexible transition overhead conductor rail 1 is determined by means of double calibration of the laser range finder 11 and the displacement sensor 3, thereby eliminating interference of factors such as uneven ground.

Measuring the lifting amount: data of the lifting amount and the lifting force is monitored by the laser range finder 11, the displacement sensor 3 and the force sensor 5, and a speed of the movable vehicle 9, an output quantity of the pneumatic cylinder and the like are regulated and controlled by means of the control system, thereby forming a closed-loop control with the sensor.

During the test of the rigid-flexible transition overhead conductor rail 1, the motor 10 and the pneumatic cylinder are firstly mounted on the movable vehicle 9, and then the spring, the pedestal 6, the force sensor 5 and the conversion plate are upwards arranged on the pneumatic cylinder in sequence. Furthermore, the laser range finder 11 and the displacement sensor 3 are mounted on the conversion plate, and the sliding plate is arranged on the displacement sensor 3. Next, the test device is actuated so that the pneumatic cylinder outputs displacement and the sliding plate is in close contact with the rigid-flexible transition overhead conductor rail 1. The lifting force is monitored by the force sensor 5, in a case that the force does not reach the requirement, the pneumatic cylinder further outputs the displacement to add the lifting force. Due to the elastic buffer of the spring, the relationship between the lifting force and the displacement of the pneumatic cylinder is not necessarily linear. The output of the pneumatic cylinder is regulated and controlled in real time according to the data of the force sensor 5 to keep the stability of the lifting force. The data of the force sensor 5 and the pneumatic cylinder form closed-loop automatic regulation and control through the control system. Subsequently, the data of the laser range finder 11 and the displacement sensor 3 at the moment are recorded, and the data of the two sensors in an initial state are calibrated to keep consistent at the moment, and then the motor 10 is started to make the movable vehicle 9 move forwards slowly, and the movement speed is controlled. In the forward movement process of the movable vehicle 9, the data of the force sensor 5 is in a stable state through the closed-loop control of the control system, and regulated in the closed-loop mode by the pneumatic cylinder in real time. Furthermore, the data of the laser range finder 11 and the data of the displacement sensor 3 are monitored by the control system in real time and mutually calibrated, thereby determining the actual and accurate lifting height data for the rigid-flexible transition overhead conductor rail 1.

In the present disclosure, the test is performed on the whole rigid-flexible transition overhead conductor rail 1 having a length of 6 m. During test, the lifting force is accurately controlled by the pneumatic cylinder, and the lifting displacement of the test is controlled by a double-displacement calibration system (double calibration of the laser range finder 11 and the displacement sensor 3), thus preventing the ground or the pedestal 6 and the like from interfering the lifting data. Furthermore, the buffering effect when the pantograph is in contact is simulated by the spring, which reflects the actual effect and the rigid-flexible characteristics when the pantograph is in contact with the rigid-flexible transition overhead conductor rail more truly, thereby achieving the purpose of effectively simulating and detecting the rigid-flexible characteristics of the rigid-flexible transition overhead conductor rail 1. The test method and the test device are simple and convenient to operate, automatic in control and detection, closed-loop in control, high in control precision and good in test stability.

Adaptations according to actual needs are within the protection scope of the present disclosure.

It should be noted that it is apparent to those skilled in the art that the present disclosure is not limited to the details of the above exemplary embodiments, and the present disclosure may be implemented with other forms without departing from the spirit or basic features of the present disclosure. Thus, in any way, the embodiments should be deemed as exemplary, not limitative. The scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims.

Several examples are used for illustration of the principles and implementation methods of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A test device for rigid-flexible characteristics of a rigid-flexible transition overhead conductor rail, comprising:
   a movable vehicle moved in a length extending direction of the rigid-flexible transition overhead conductor rail,
   a telescopic mechanism mounted on the movable vehicle and configured for providing lifting force for the rigid-flexible transition overhead conductor rail, wherein the telescopic mechanism stretches out and draws back in a vertical direction;
   a conversion plate connected to a top end of the telescopic mechanism and configured to synchronously move in the vertical direction with the telescopic mechanism;
   a sliding assembly mounted at a top of the conversion plate;
   a force sensor arranged between the telescopic mechanism and the conversion plate, and configured to detect and adjust the lifting force to be constant; and
   a displacement detection mechanism arranged on the conversion plate and configured to monitor a vertical distance between the conversion plate and the ground;
   wherein the sliding assembly slides along the rigid-flexible transition overhead conductor rail with the movable vehicle; the rigid-flexible transition overhead conductor rail is located over the sliding assembly, and the sliding assembly abuts against a bottom wall of the rigid-flexible transition overhead conductor rail.

2. The test device according to claim 1, wherein an elastic assembly for buffering the lifting force is arranged between the telescopic mechanism and the displacement detection mechanism.

3. The test device according to claim 2, wherein a bottom end of the elastic assembly is connected to the telescopic mechanism, and a pedestal for supporting the displacement detection mechanism is connected to a top end of the elastic assembly.

4. The test device according to claim 3, wherein the telescopic mechanism is a pneumatic cylinder; the pneumatic cylinder comprises a cylinder body and a telescopic rod telescopically arranged on the cylinder body in the vertical direction; the elastic assembly is connected to the cylinder body, and the telescopic rod is located between the cylinder body and the movable vehicle.

5. The test device according to claim 4, wherein the displacement detection mechanism comprises a laser range finder and a displacement sensor which are arranged on the conversion plate together; the laser range finder and the displacement sensor are both configured to measure a distance between the conversion plate and the ground.

6. The test device according to claim 5, wherein the displacement sensor comprises a base arranged on the conversion plate, and the sliding assembly is mounted on the base.

7. The test device according to claim 6, wherein the sliding assembly comprises a mounting plate arranged on the base; a support wheel abutting against the bottom wall of the rigid-flexible transition overhead conductor rail is arranged on the mounting plate.

8. The test device according to claim 7, wherein the movable vehicle comprises a vehicle body and a plurality of pulleys arranged at a bottom of the vehicle body, the pulleys are movably arranged on the ground, and a motor for driving the pulleys to move at a constant speed is arranged on the vehicle body.

9. The test device according to claim 8, wherein the elastic assembly is a spring stretching out and drawing back in the vertical direction.

10. A test method using the test device for rigid-flexible characteristics of the rigid-flexible transition overhead conductor rail according to claim 9, comprising following steps:
   driving the movable vehicle: controlling, by the motor and a control system, displacement and speed of horizontal movement of the movable vehicle, thereby achieving a purpose of stably testing a lifting amount of the rigid-flexible transition overhead conductor rail in a length direction;
   adjusting lifting force: in forward movement process of the movable vehicle, providing, by the pneumatic cylinder, upward and stable contact force to enable the support wheel to be in contact with the rigid-flexible transition overhead conductor rail; and buffering, by means of the spring, a relationship between the contact force and the lifting amount to simulate elasticity of a pantograph; and testing, by the force sensor, the lifting force;
   measuring a distance between the conversion plate and the ground: determining, by means of double calibration of the laser range finder and the displacement sensor, the lifting amount of the rigid-flexible transition overhead conductor rail, and eliminating interference of factors such as uneven ground; and
   measuring the lifting amount: monitoring data of the lifting amount and the lifting force by the laser range finder, the displacement sensor and the force sensor; and regulating and controlling, by the control system, the speed of the movable vehicle, output quantity of the pneumatic cylinder, thereby forming a closed-loop control with the displacement sensor and the force sensor.

11. The test device according to claim 2, wherein the telescopic mechanism is a pneumatic cylinder; the pneumatic cylinder comprises a cylinder body and a telescopic rod telescopically arranged on the cylinder body in the vertical direction; the elastic assembly is connected to the cylinder body, and the telescopic rod is located between the cylinder body and the movable vehicle.

12. The test device according to claim 11, wherein the displacement detection mechanism comprises a laser range finder and a displacement sensor which are arranged on the conversion plate together; the laser range finder and the displacement sensor are both configured to measure a distance between the conversion plate and the ground.

13. The test device according to claim 12, wherein the displacement sensor comprises a base arranged on the conversion plate, and the sliding assembly is mounted on the base.

14. The test device according to claim 13, wherein the sliding assembly comprises a mounting plate arranged on the base; a support wheel abutting against the bottom wall of the rigid-flexible transition overhead conductor rail is arranged on the mounting plate.

15. The test device according to claim 14, wherein the movable vehicle comprises a vehicle body and a plurality of pulleys arranged at a bottom of the vehicle body, the pulleys are movably arranged on the ground, and a motor for driving the pulleys to move at a constant speed is arranged on the vehicle body.

16. The test device according to claim 15, wherein the elastic assembly is a spring stretching out and drawing back in the vertical direction.

17. A test method using the test device for rigid-flexible characteristics of the rigid-flexible transition overhead conductor rail according to claim 9, comprising following steps:
   driving the movable vehicle: controlling, by the motor and a control system, displacement and speed of horizontal movement of the movable vehicle, thereby achieving a purpose of stably testing a lifting amount of the rigid-flexible transition overhead conductor rail in a length direction;
   adjusting lifting force: in forward movement process of the movable vehicle, providing, by the pneumatic cylinder, upward and stable contact force to enable the support wheel to be in contact with the rigid-flexible transition overhead conductor rail; and buffering, by means of the spring, a relationship between the contact force and the lifting amount to simulate elasticity of a pantograph; and testing, by the force sensor, the lifting force;
   measuring a distance between the conversion plate and the ground: determining, by means of double calibration of the laser range finder and the displacement sensor, the lifting amount of the rigid-flexible transition overhead conductor rail, and eliminating interference of factors such as uneven ground; and
   measuring the lifting amount: monitoring data of the lifting amount and the lifting force by the laser range finder, the displacement sensor and the force sensor; and regulating and controlling, by the control system, the speed of the movable vehicle, output quantity of the pneumatic cylinder, thereby forming a closed-loop control with the displacement sensor and the force sensor.

* * * * *